UNITED STATES PATENT OFFICE.

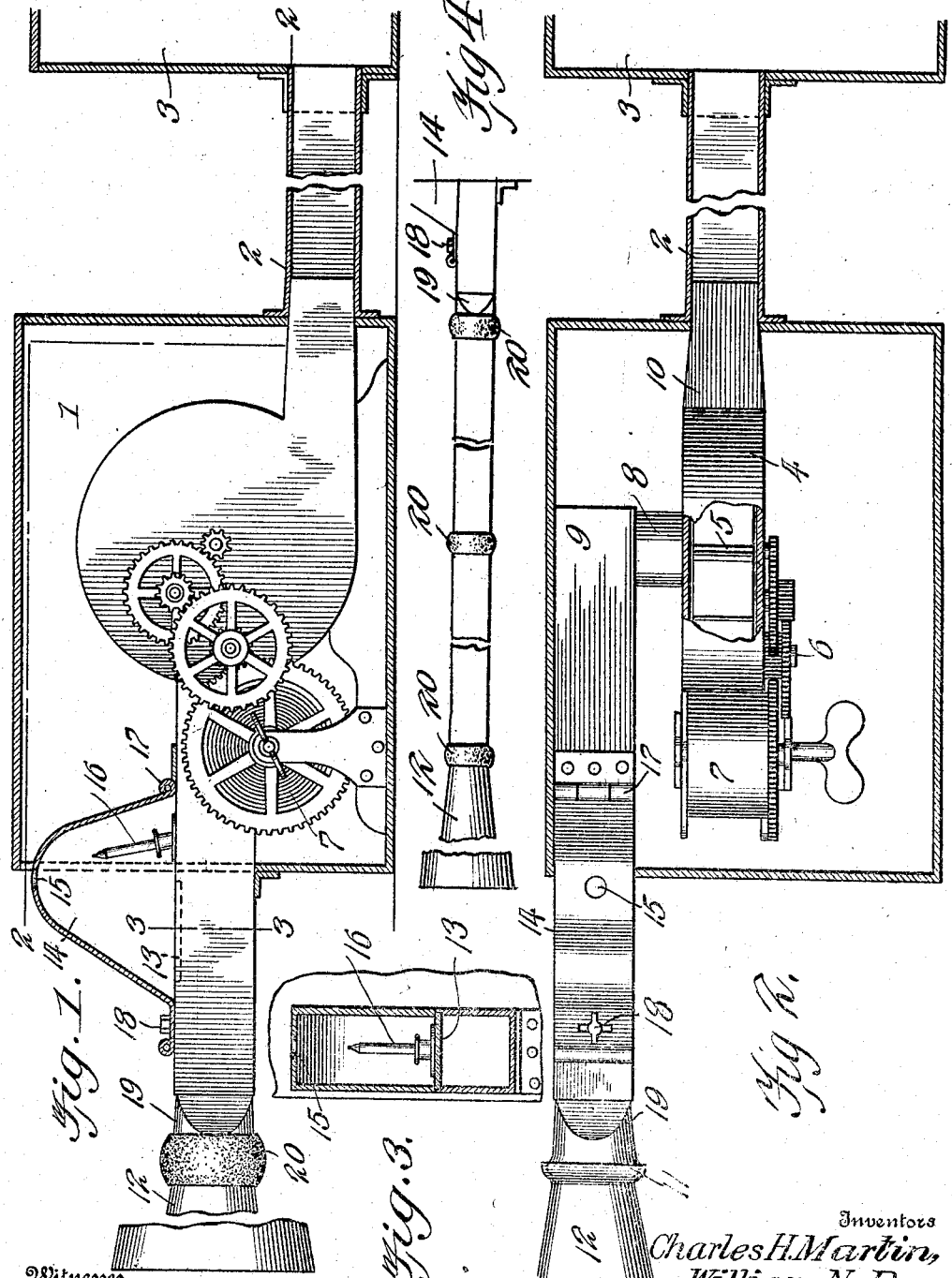

CHARLES H. MARTIN AND WILLIAM N. ROSS, OF JACKSONVILLE, TEXAS.

COMBINED BIRD AND INSECT CATCHER.

No. 919,907.      Specification of Letters Patent.    Patented April 27, 1909.

Application filed October 14, 1908. Serial No. 457,672.

*To all whom it may concern:*

Be it known that we, CHARLES H. MARTIN and WILLIAM N. ROSS, citizens of the United States, residing at Jacksonville, in the county of Cherokee and State of Texas, have invented new and useful Improvements in a Combined Bird and Insect Catcher, of which the following is a specification.

This invention relates to apparatus for collecting birds and insects mechanically, and has for its object to provide a device of this character that will attract birds or insects together and then draw and deposit them by means of a current of air into a receptacle by which the birds may be removed and the insects exterminated.

The invention is more particularly designed for catching birds or insects by night, the birds or insects being attracted by a light contained within the device and which reflects through the funnel shaped mouth of the apparatus so that the birds or insects may be readily drawn within the apparatus through the medium of a current of air.

With the above and other objects in view, which will appear as the description progresses, the invention resides in the novel construction and the arrangement of parts hereinafter fully described and claimed.

In the accompanying drawing there has been illustrated a simple and preferred embodiment of the device, but it is to be understood that we do not limit ourselves to the precise structural details therein exhibited as minor details within the form and proportion of the device may be made when desired.

In the drawing, Figure 1 is a longitudinal sectional view through the casing containing a portion of the improvement, the apparatus being illustrated in elevation. Fig. 2 is a horizontal section upon the line 2—2 of Fig. 1. Fig. 3 is a detail transverse sectional view upon the line 3—3 of Fig. 1. Fig. 4 is a plan view of a plurality of the pipe members which may be employed in connection with the device.

In the device illustrated in the accompanying drawing the apparatus proper is positioned within a suitable rectangular casing 1, but it is to be understood that this casing is not essential in carrying out our invention and may be readily dispensed with if desired. The casing 1 is provided with a rearwardly extending chute 2 communicating with a receptacle 3 which is adapted for the reception of birds or insects deposited therein in a manner hereinafter fully described.

Positioned within the casing 1 is a suitable fan casing 4 carrying an ordinary suction fan 5 which is adapted to be driven by a suitable motor 6 which in this case comprises a plurality of cog wheels adapted to receive motion from a suitable spring 7, but it is to be understood that we do not limit ourselves to any precise form of motor power as an electric motor, engine or other suitable motive power may be employed if desired.

Secured to and communicating with the fan casing 4 through the medium of the hollow cylindrical member 8 is the chute 9 through which the birds or insects are adapted to be drawn by the suction fan 5 and to be forced through the outlet 10 of the casing through the chute 2 and into the receptacle 3.

The chute 9 extends a suitable distance beyond the outer face of the receptacle 1 and is adapted for the reception of a plurality of pipe members which may be jointed or otherwise removably connected together to provide a desired length, and the outermost one of these sections is provided with an enlarged annular mouth or offset adapted for the reception of an annular member 11 provided upon the inner reduced extremity of a funnel shaped mouth piece 12. By this arrangement it will be noted that the mouth piece 12 may be arranged at any desired distance away from the casing 1 and that insects or birds coming into close proximity with the mouth 12 will be drawn therein and through the chute 11, passage 8, fan casing 4, outlet 10, chute 2, into the receptacle 3.

In order to attract birds or insects during the night we have provided the chute 9 with a suitable light containing chamber 14, and the wall of the chute adjacent said chamber with a suitable opening provided with a glass closure 13 whereby the light from the chamber will be directed toward the chute. This chamber 14 is closed upon all sides but is provided with a small outlet 15 through which the smoke from the lamp or candle 16 may be allowed to escape. The chamber 15 is preferably hingedly connected with the chute 9 as at 17 and is retained in locked position through the medium of a bolt 18 or other suitable securing device. By this arrangement it will be noted that the light from the candle 16 is reflected through the glass 13 to the mouth of the device, through which it will readily shine and attract birds or insects which will be easily drawn therein through the medium of the suction fan 5 of the device.

It will be noted that the outermost pipe section 19 and reduced portion 11 of the mouth member 12 are connected together by loose annular members one overlying the other. By this arrangement the bell mouth 12 may be directed at any desired angle, and in order to retain the mouth in its relation with the pipe section 19, we have provided a flexible collar 20, which will not only retain the mouth and the pipe section in proper engagement with each other but will effectively prevent the light from shining through the joint of the members.

Having thus fully described the invention what is claimed as new is:

In a device for the purpose set forth, a receptacle, a chute connected with said receptacle, a casing connected with the chute, a fan casing containing a fan connected with the chute, means for driving the fan, a second chute connected with the fan casing, a transparent member upon this chute, a light chamber above the transparent member, detachable pipe sections connected with the chute, a bell-shaped mouth for the outermost pipe section, and a flexible connection between the said mouth and said pipe section.

In testimony whereof we affix our signatures in presence of two witnesses.

CHARLES H. MARTIN.
WILLIAM N. ROSS.

Witnesses:
C. M. REAGAN,
T. B. HUNT.